United States Patent

Okamoto

[11] Patent Number: 6,094,120
[45] Date of Patent: Jul. 25, 2000

[54] MAGNETIZING APPARATUS

[75] Inventor: Shozo Okamoto, Okayama, Japan

[73] Assignee: B. C. O. Co., Ltd., Okayama, Japan

[21] Appl. No.: 09/274,529

[22] Filed: Mar. 23, 1999

[30] Foreign Application Priority Data

May 19, 1998 [JP] Japan ................... 10-137042

[51] Int. Cl.[7] .................................... H01F 7/20
[52] U.S. Cl. .................. 335/284; 335/302; 335/306; 335/285; 210/222; 210/223
[58] Field of Search ................ 335/285, 301–306; 210/222, 223, 695; 96/1; 95/28

[56] References Cited

U.S. PATENT DOCUMENTS

| | | | |
|---|---|---|---|
| 4,210,535 | 7/1980 | Risk | 210/222 |
| 4,367,143 | 1/1983 | Carpenter | 210/223 |
| 4,605,498 | 8/1986 | Kulish | 210/695 |
| 5,460,144 | 10/1995 | Park et al. | 123/538 |
| 5,536,401 | 7/1996 | Burns | 210/222 |
| 5,558,765 | 9/1996 | Twardzik | 210/222 |
| 5,840,184 | 11/1998 | Te-Chin | 210/222 |

FOREIGN PATENT DOCUMENTS 63-44151  11/1988  Japan .

*Primary Examiner*—Lincoln Donovan
*Assistant Examiner*—Tuyen T. Nguyen
*Attorney, Agent, or Firm*—Jordan and Hamburg LLP

[57] ABSTRACT

A magnetizing apparatus mounted around periphery of a conduit for exerting magnetic fields to fluids such as water flowing through the conduit. The apparatus comprises a pair of cases being freely opened on one side; a pair of grooves formed inside the cases respectively, and a pairs of holders installed in the grooves for holding a plurality of permanent magnets with the magnets being aligned along the length of the grooves. On the cases being faced, the grooves are opposed to each other to form a hole for introducing the conduit, and the paired holders are opposed to each other, with the rows of the magnets being opposed to each other. Furthermore, one or both of the opposing holders are supported by elastic members. When the cases are fastened by a fastening unit, with the cases being fitted to the periphery of the conduit, the elastic members are deformed according to the outer diameter of the conduit, and the holders supported by the elastic members are displaced and adhered to the periphery of the conduit by restoring force of the elastic members.

6 Claims, 10 Drawing Sheets

F I G. 2
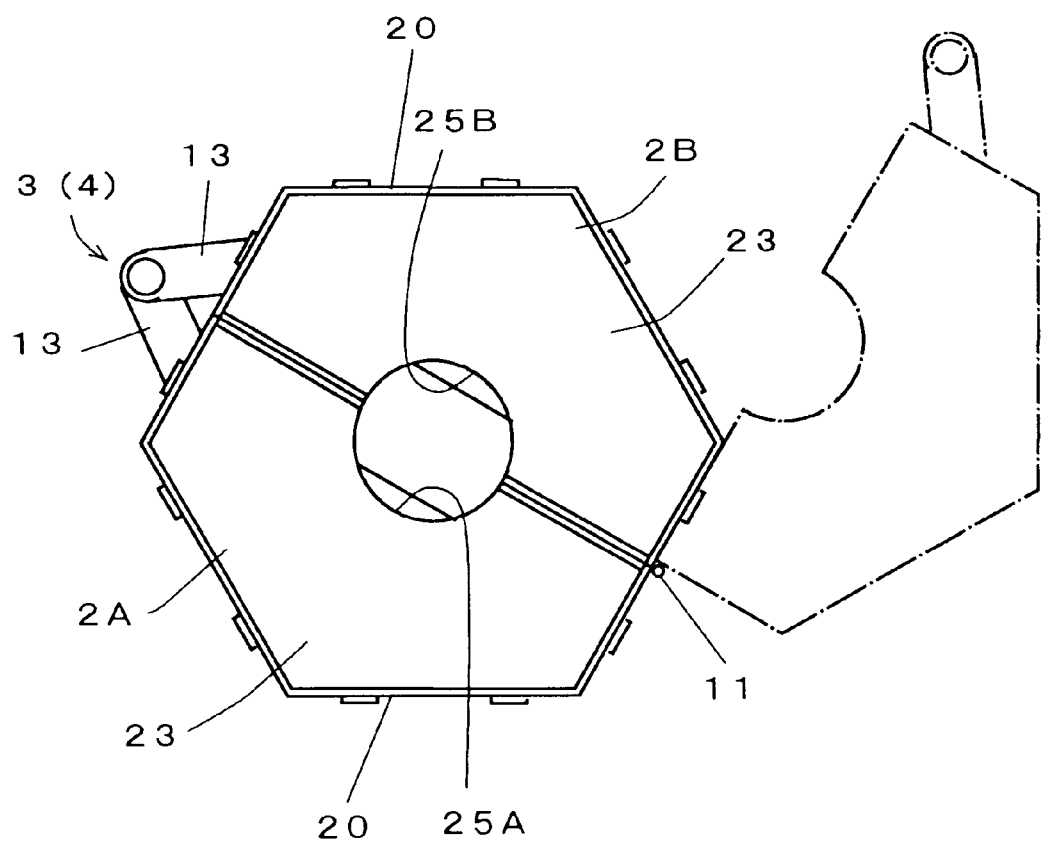

MAGNETIZING APPARATUS

BACKGROUND OF THE INVENTION

The present invention relates to a magnetizing apparatus for exerting magnetic forces to fluids such as water for improving the quality of the fluids, and concretely relates to an apparatus mounted onto a conduit such as a water-pipe to exert magnetic forces from permanent magnets inside the conduit.

Conventionally, there is an apparatus which comprises a pair of cases which are hinged on one side, whereas freely opened on other side, a plurality of permanent magnets which are installed in the cases with being aligned along the length for rowing magnetic poles, and grooves formed inside the rows of magnetic poles, in which a hole for introducing the conduit is formed by facing the grooves (Japanese Utility Publication No. 44151 of 1988).

On mounting the above apparatus onto the conduit, the cases are fitted to the periphery of the conduit in a opened state, and then the cases are face to each other so that the magnetic poles are aligned around and along the conduit. Therefore, magnetic fields from the magnets exert inside the conduit to magnetize the water flowing therein.

However, in the conventional apparatus, the introducing hole is formed as having a fixed inside diameter. Therefore, the apparatus can only be mounted onto the conduit having a fixed outer diameter, and many kinds of apparatus should be needed for conduits having different outer diameters.

Furthermore, on producing the apparatus, errors may be caused in the inside diameter of the introducing hole, or the values of the diameters may vary depending on the products. In case the inside diameter of the hole becomes smaller than the outer diameter of the conduit, it can be an obstacle for mounting the apparatus onto the conduit. Whereas in case the inside diameter of the hole is larger than the outer diameter of the conduit, the apparatus is unstable onto the conduit, and furthermore, since the distance from the magnets to the conduit become larger, the magnetic forces exerting inside the conduit become weak to reduce the ability of the magnetization, thus raising problem.

SUMMARY OF THE INVENTION

The invention has been achieved to fully solve the above problem. The object of the invention is to provide a novel magnetizing apparatus which can be mounted onto conduits having different sizes, and can be supported onto the conduit in stable condition even if the inside diameter of introducing hole is not formed to be suited when producing the apparatus, and can exert uniform and strong magnetic fields inside the conduit.

According to an embodiment of the invention, a magnetizing apparatus is provided, which comprises a pair of cases which are hinged to each other on one side, and are freely opened on other side; a fastening unit installed on the cases on the freely-opened side for fastening the cases being faced to each other; a pair of grooves formed inside the cases respectively, as being opposed to each other to form a hole for introducing the conduit on the state of the cases being faced; and one or plural pairs of holders for holding a plurality of permanent magnets with being aligned therein. The respective paired holders are installed into the grooves so that the holders are opposed to each other when the cases being faced, with the magnets in the respective holders being aligned along the length of the groove, and the respective rows of the magnets being opposed to each other. And one or both of the opposing holders are supported by elastic members so that each supported holder can be sprung back toward the opposite holder.

On mounting the above magnetizing apparatus onto the conduit, first, the respective cases are fitted to the periphery of the conduit, in a opened state. Then, the cases are faced and fastened by the fastening unit. In this locking state, the elastic members are deformed according to the outer diameter of the conduit, and the holders which are supported by the elastic members are displaced and adhered to the periphery of the conduit by restoring force of the elastic members. Therefore, the apparatus can be mounted onto conduits having different sizes in stable condition.

In addition, when the apparatus being mounted onto the conduit, the respective magnetic poles of the magnets in the respective pairs of holders are aligned along the length of the paired conduit, and the respective rows of the magnets installed in the holders are opposed to each other via the conduit, to generate the uniform and strong magnetic forces exerting inside the conduit.

An aspect of the fastening unit comprises a plurality of pipes which are installed on the outer surfaces of the cases on the freely-opened side, and are aligned in series when the cases are faced to each other; and a plurality of locking members introduced through the respective pipes as being able to reciprocate along the length of the pipes with the opposing members being contacted with each other. According this fastening unit, it is possible to fasten and unfasten the cases by shifting the respective locking members through the pipes, to facilitate the open-close operation of the cases and the locking operation. Furthermore, the pipes can be used for a handhold for carrying the apparatus.

BRIEF DESCRIPTION OF THE DRAWINGS

FIG.2 is a side view of the magnetizing apparatus shown in FIG.1;

DETAILED DESCRIPTION OF THE INVENTION

Figure 1:
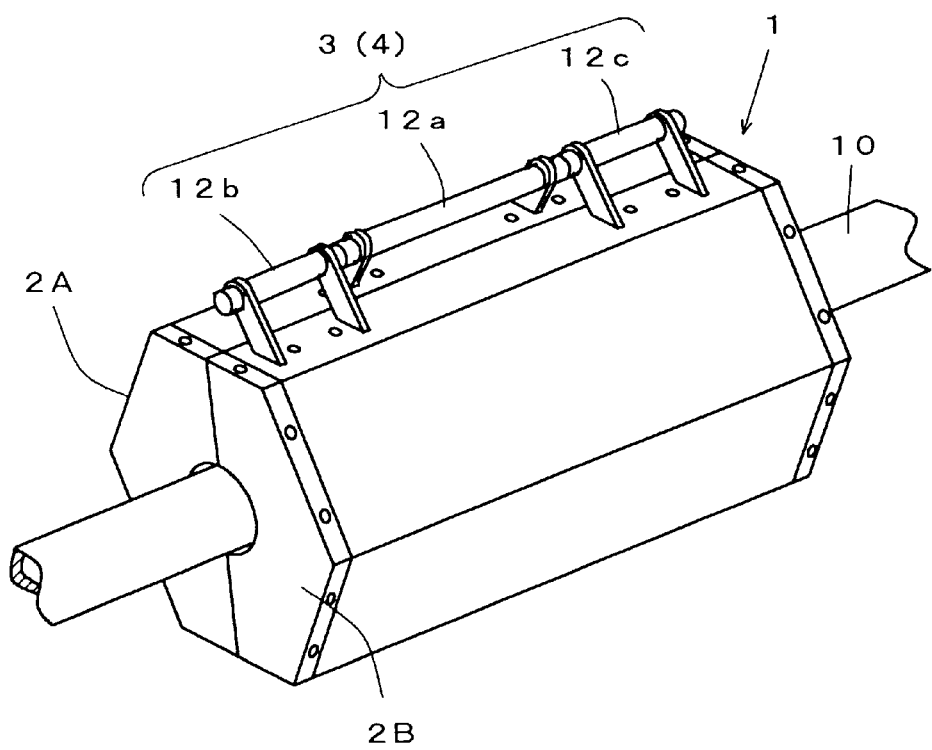
FIG. 1 is a perspective view showing a magnetizing apparatus in use according to an embodiment of the invention.

FIG. 1 shows a magnetizing apparatus 1 according to an embodiment of the present invention which is mounted onto a conduit 10 such as a water-pipe.

The apparatus 1 is for improving the quality of tap water flowing through the conduit 10 via magnetization, but the object of magnetization cannot be defined to tap water, and the apparatus may be applied for general magnetization of fluids such as water, liquid, and gas.

The exemplified magnetizing apparatus 1 comprises a pair of cases 2A and 2B which are mounted around the periphery of the conduit 10. As shown in FIG. 2, the cases 2A and 2B are coupled by several hinges 11 on one side thereof, whereas are freely opened on the other side.

Figure 3:
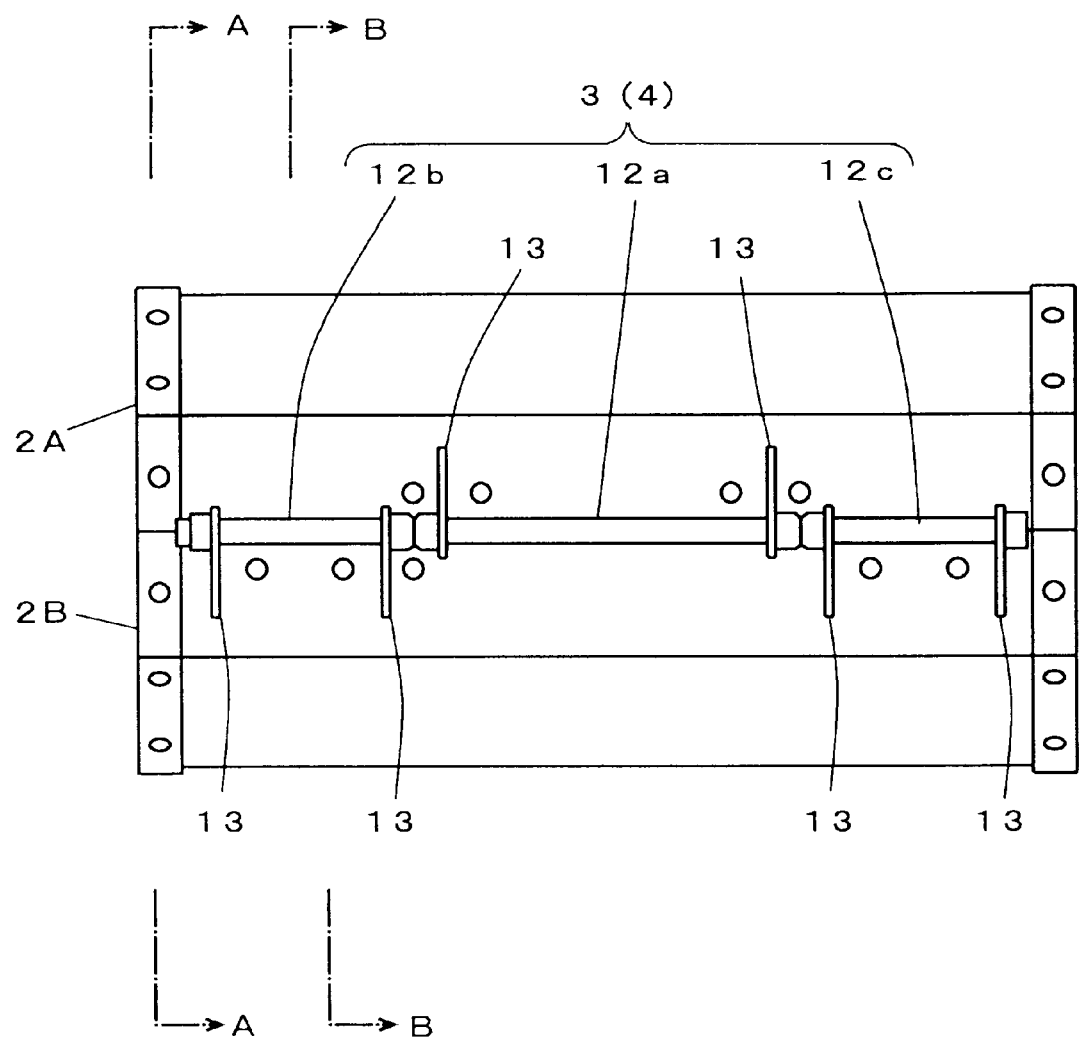
FIG.3 is a plane view of the magnetizing apparatus.
Figure 4:
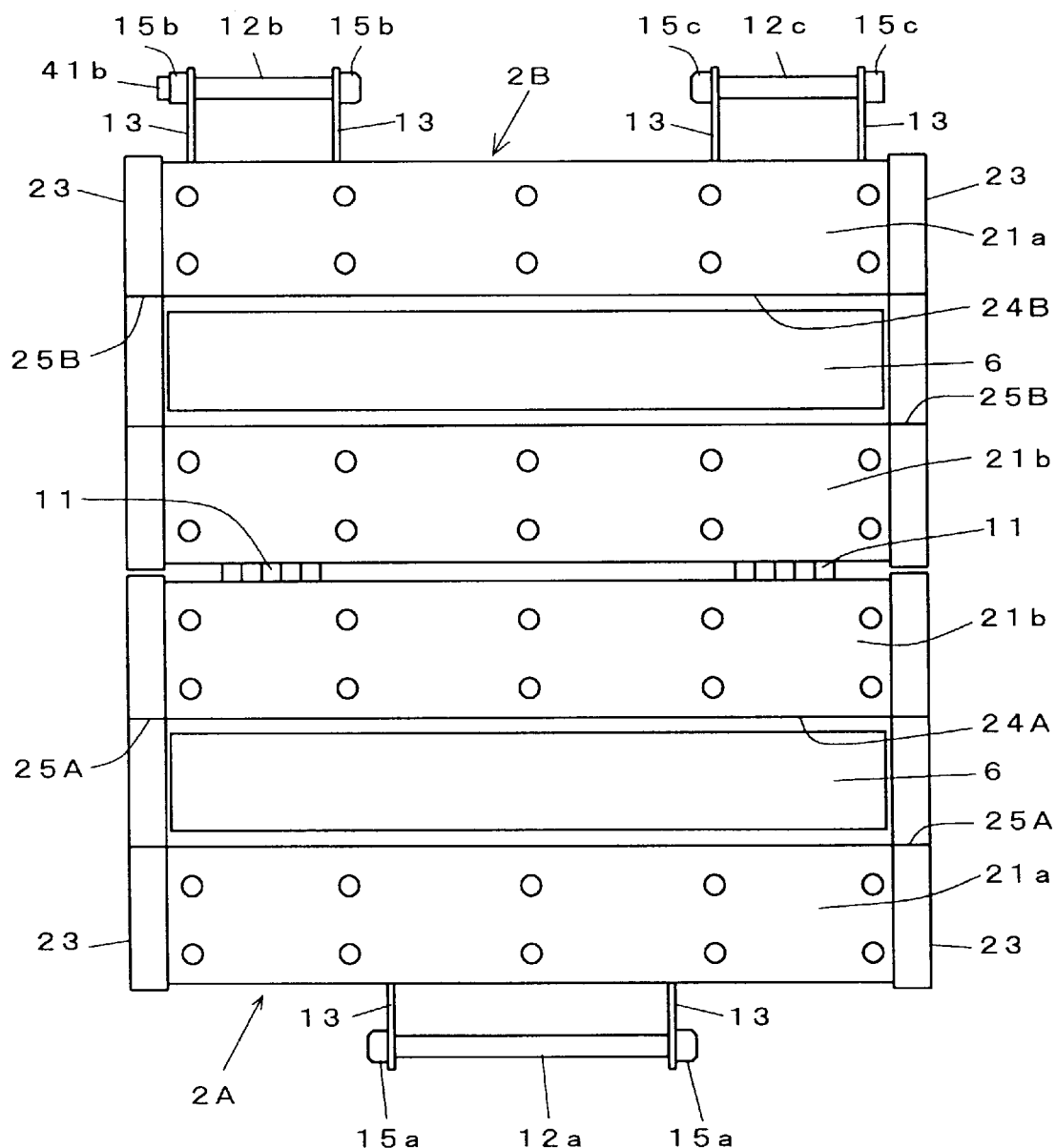
FIG.4 is a plane view showing the opened state of the apparatus on releasing the engagement of the cases.

The outer surfaces of the cases 2A and 2B are, as shown in FIGS. 3 and 4, provided with pipes 12a, 12b, and 12c in said freely-opened side. The pipes 12a, 12b, 12c are aligned in series when the cases 2A and 2B are faced to each other. Each of the three pipes 12a, 12b, and 12c is supported on the cases 2A or 2B by a pair of supporting members 13 on both ends. The pipes 12a, 12b and 12c and the respective supporting members 13 constitute a handhold 3 for carrying the apparatus 1, as well as a fastening unit 4 for fastening the both cases 2A and 2B.

Among the pipes, the middle pipe 12a is installed on the case 2A, and the other two pipes 12b and 12c on both ends are respectively installed on the case 2B with being spaced a distance comparable to the length of the pipe 12a.

Figure 5:
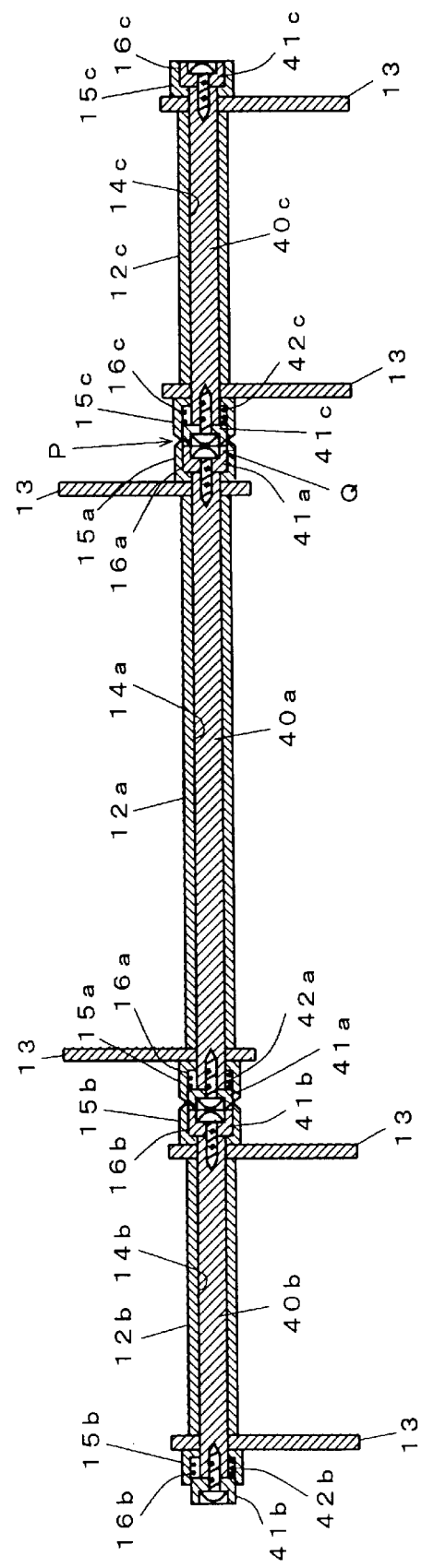
FIG.5 is a cross-sectional view showing constitution of a fastening unit for fastening the cases.

As shown in FIG.5 the pipes 12a, 12b, 12c are respectively connected to a pair of cylinders 15a and 15a, 15b and 15b, 15c and 15c on the both ends. The cylinders 15a, 15b, 15c respectively comprise holes 16a, 16b, 16c which are larger than the holes 14a, 14b, 14c of the pipes 12a, 12b, 12c. The respective holes 14a, 14b, 14c of the three pipes 12a, 12b, 12c and the holes 16a, 16b, 16c of the six cylinders 15a, 15b, 15c are continued in line.

Furthermore, the respective pipes 12a, 12b, 12c contain locking bars 40a, 40b, 40c in the holes 14a, 14b, 14c, with the bars being able to reciprocate along the length of the pipes. On both ends of the locking bars 40a, 40b, 40c, clamps 41a, 41b, 41c are secured respectively. The clamps 41a, 41b, 41c have respectively outside diameters enough for engaging the holes 16a, 16b, 16c of the cylinders 15a, 15b, 15c, and the clamps 41a, 41a secured on the middle pipe 12a are respectively faced to the clamps 41b, 41c on the inner ends of the pipes 12b, 12c.

The respective cylinders 15a, 15b, 15c house springs 42a, 42b, 42c therein, and the locking bars 40a, 40b, 40c are spring loaded by the spring 42a, 42b, 42c as being displaced along the direction from the pipe 12c to the pipe 12b, by elasticity of the springs 42a, 42b, 42c. Therefore, the positions Q where the opposing clamps are faced to each other, are shifted from the positions P where the opposing cylinders are faced to each other, to make a locking condition in that the cases 2A and 2B are fastened. In this locking condition, the outer-side clamp 41b secured on the locking bar 40b stick out of the cylinder 15b. When unfastening the engagement of the cases 2A and 2B, the clamp 41b sticking out is pushed into the cylinder 15b to shift all the locking bars 40a, 40b, 40c along the direction from the pipe 12b to the pipe 12c. Then said facing positions P and Q are adjusted to make the cases 2A and 2B unfastened.

Figure 6:
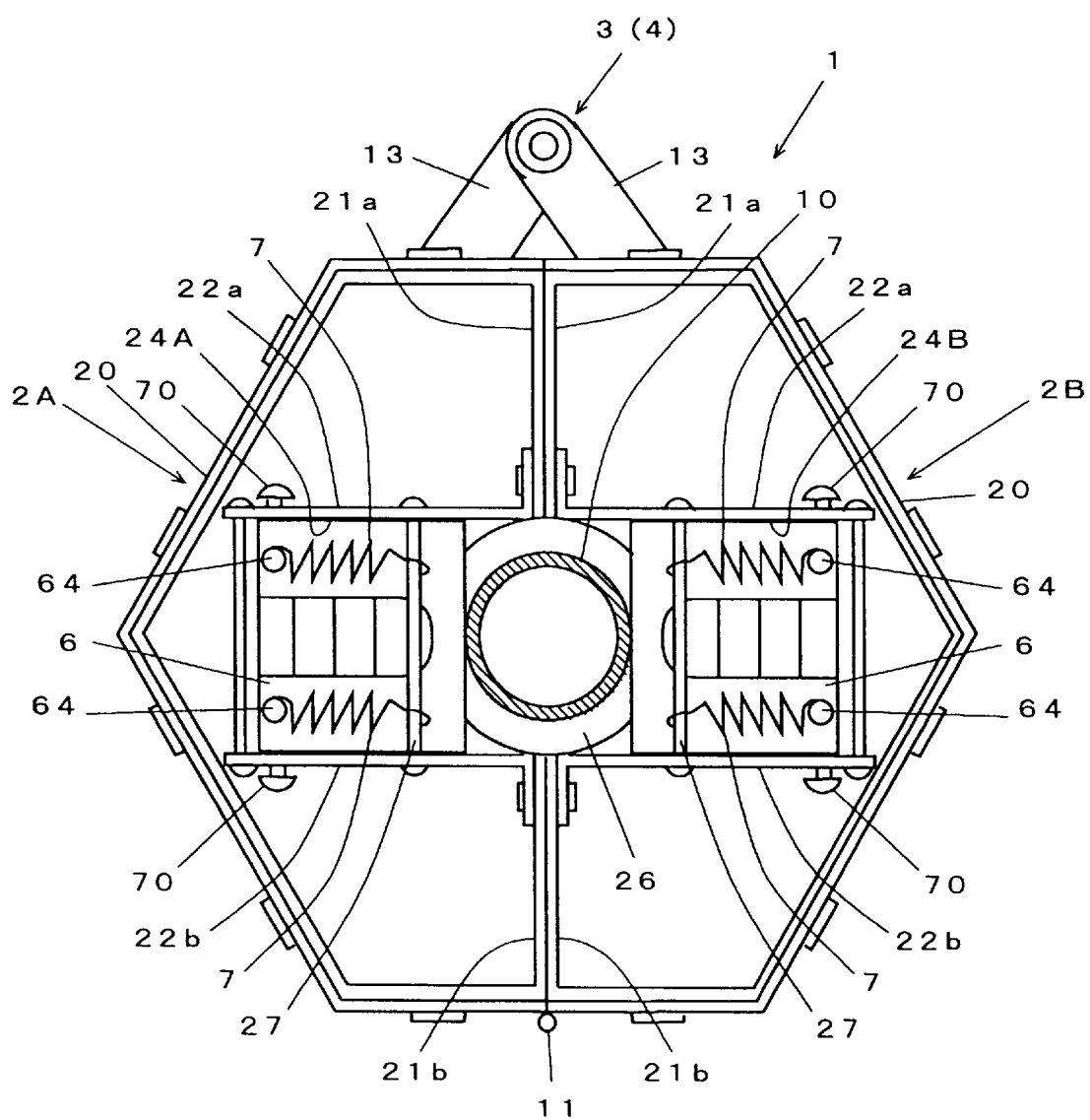
FIG.6 is a cross-sectional view taken along line A—A of FIG.3.
Figure 7:
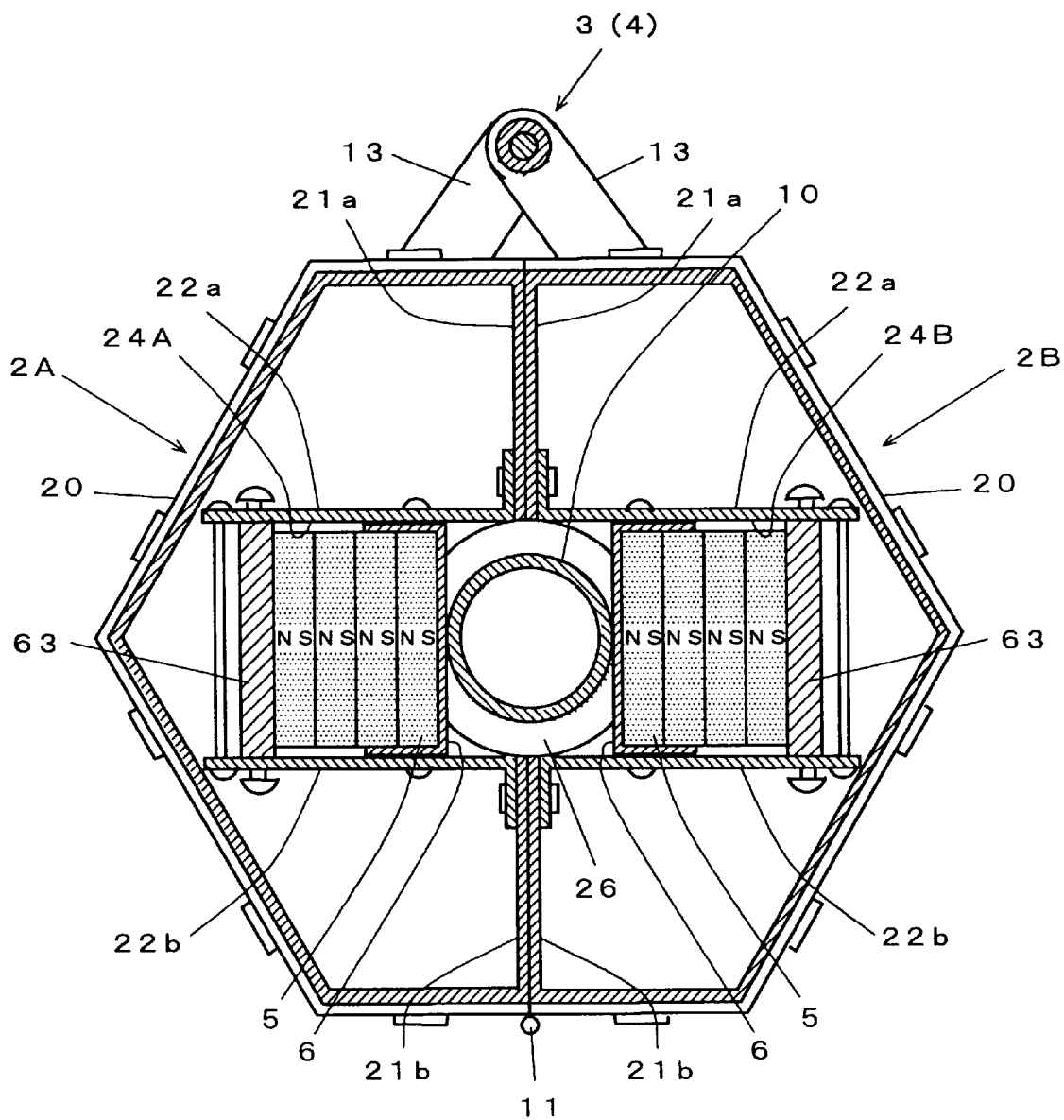
FIG.7 is a cross-sectional view taken along line B—B in FIG.3.
Figure 8:
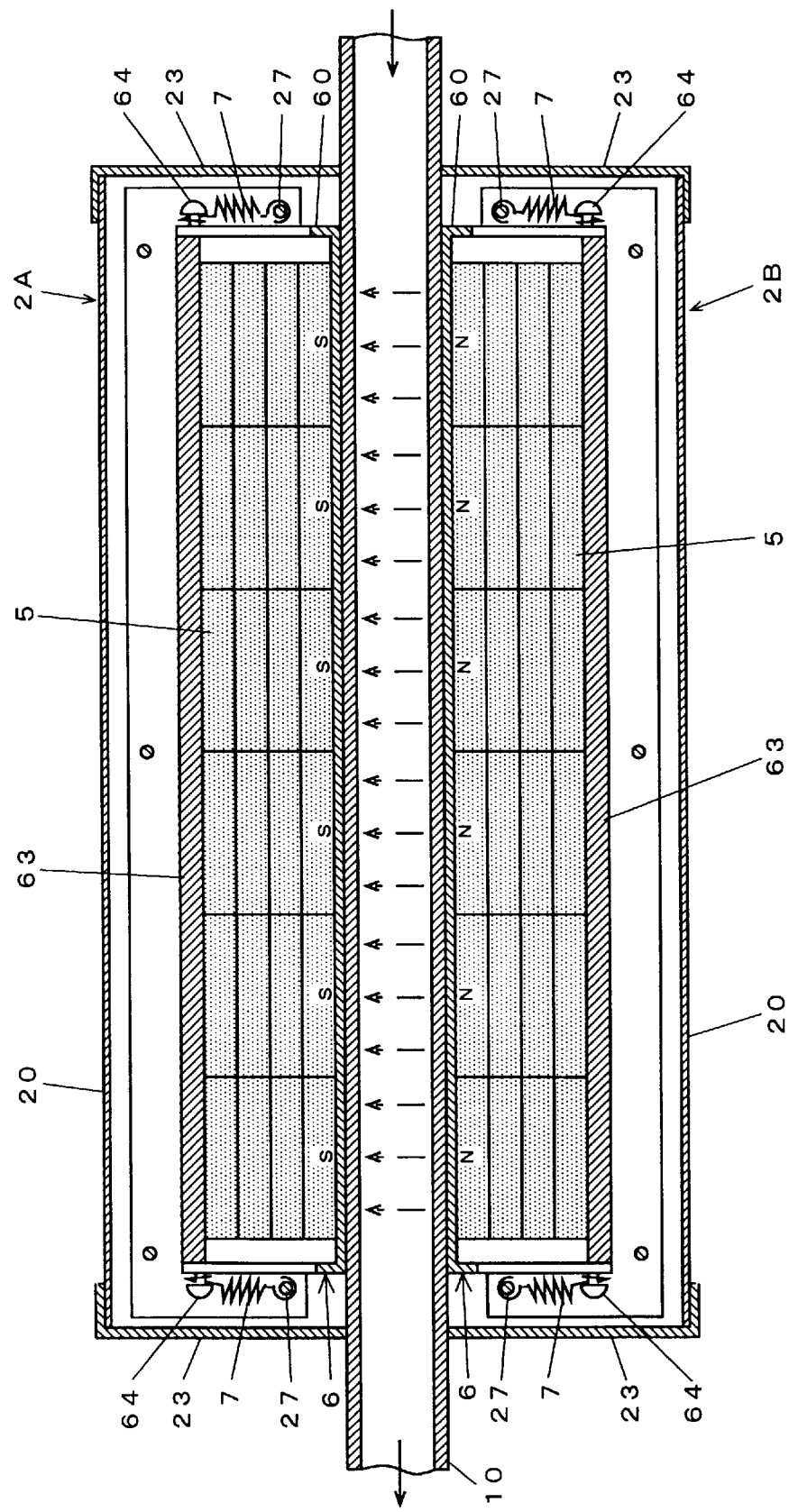
FIG.8 is a longitudinal sectional view of the magnetizing apparatus.

FIGS. 6 through 8 show the detailed constitution of the cases 2A and 2B. Each case comprises a housing 20 in the shape of a divided hollow polyhedron, a pair of contacting plates 21a, 21b, a pair of supporting plates 22a, 22b continued from the contacting plates 21a, 21b with directing inward respectively, and a pair of end plates 23, 23 for filling openings surrounded by said housing 20, contacting plates 21a, 21b, and the supporting plates 22a, 22b on both ends thereof.

The respective end plates 23 of the cases 2A and 2B, as shown in FIG.2, comprise half-round concavities 25A, 25B respectively, and inside the cases 2A and 2B, grooves 24A, 24B along the whole length of the cases are formed by the opposite supporting plates 22a, 22b. When facing the cases 2A and 2B, the concavities 25A and 25B as well as the grooves 24A and 24B are opposed to each other, and all of the concavities and the grooves are continued to form a hole 26 for introducing said conduit 10.

In the respective grooves 24A and 24B, holders 6, 6 for holding a plurality of permanent magnets 5 are disposed so as to reciprocate along the width of the supporting plates 22a, 22b. The magnets 5 are shaped into rectangular-plates, and are aligned in the holders 6 with their magnetic poles being oriented toward the same direction.

Figure 9:
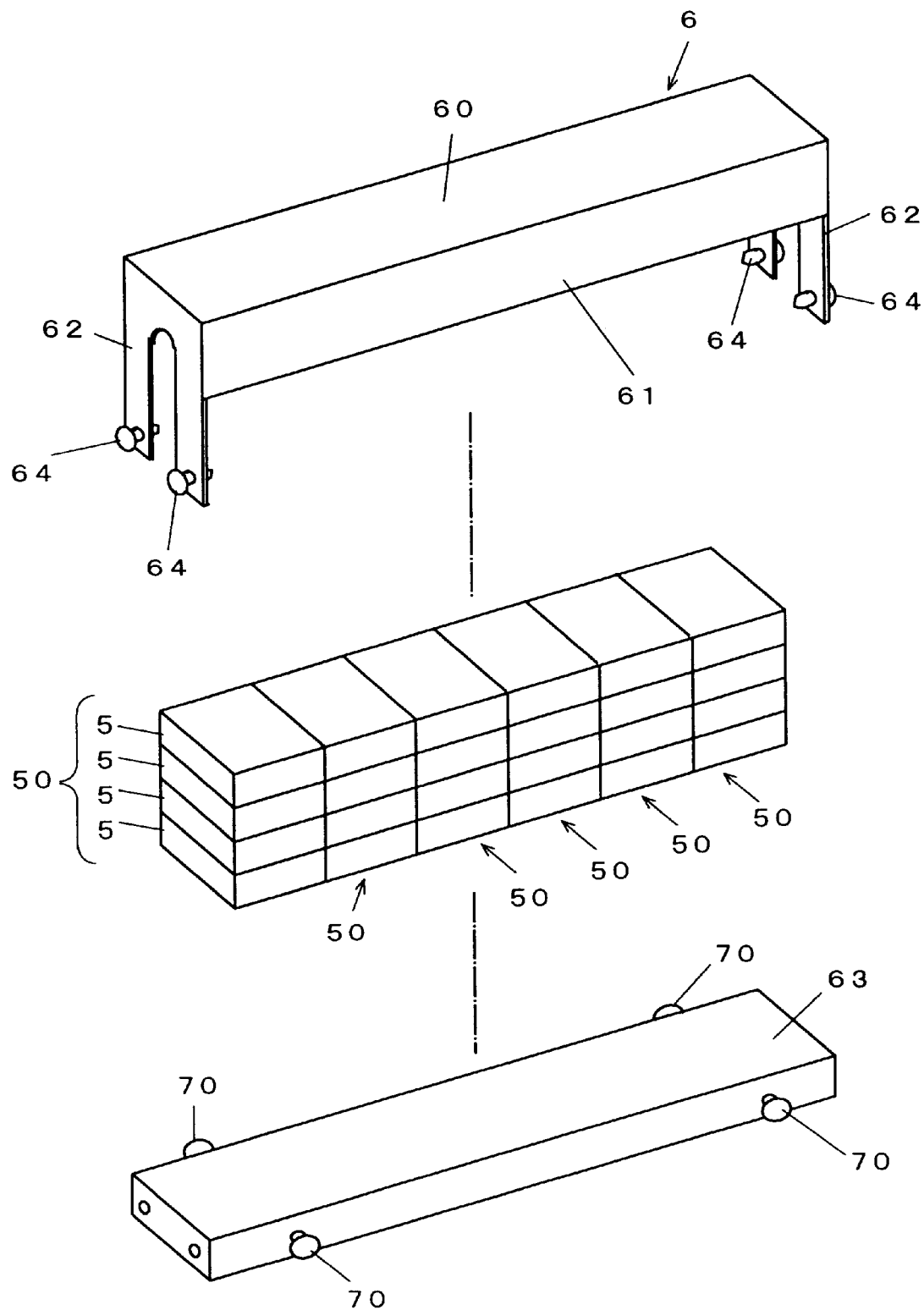
FIG.9 is a exploded perspective view showing a constitution of a holder, and permanent magnets installed into the holder.

As shown in FIG. 9, each holder 6 comprises a upper plate 60 whose width and length are comparable to those of said groove 24A/24B, which are formed integrally with a pair of side plates 61, 61 and a pair of end plates 62, 62 on both of the opposing sides and ends of the plate 60 respectively.

In a space surrounded with the respective plates 60, 61, 62, six laminates 50 of magnets 5 are installed along the length of the holder 6. Each laminate 50 is formed by laminating four magnets 5 in the longitudinal direction and the laminates 50 being aligned are supported by a metal stop plate 63 which is secured on both ends to the end plates 62, 62 by pairs of screws 64, 64 respectively.

Each of the magnets 5 is magnetized so that N-pole is on one surface, and S-pole is on the opposite surface. And as shown in FIGS. 7 and 8, the respective magnets 6 are laminated and arranged so that S-poles of the magnets 5 in the case 2A and N-poles of the magnets 5 in the other case 2B are opposed to the conduit 10 respectively. In this way, N and S poles are opposed interposing the conduit 10 therebetween, to induce magnetic lines of force from N poles to S poles (shown by dot-dash lines in FIG.8), inside the conduit 10.

In each of the cases 2A, 2B, the opposite supporting plates 22a 20 and 22b are interlinked via a pair of holding axes 27, 27 on the both ends of the plates respectively. Furthermore, on each end, a pair of elastic members 7, 7 made of extension springs are attached between a pair of screws 64, 64 secured onto the end plate 62 and the axis 27 respectively. Therefore, each of the holders 6, 6 in the respective cases 2A and 2B is elastic supported so that the holder 6 can be sprung back toward the opposite holder 6.

In FIG.9, the stop plate 63 are provided with screws 70 secured to the side face thereof. And the respective supporting plates 22a, 22b are provided with slide holes (not shown) shaped for being lengthy along the width of the plates 22a, 22b. By engaging the screws 70 into the slide holes respectively with being able to slide along the length of the holes, the direction and the amount of the displacement of the holder 6 are restricted.

However, it is not necessary that both holders 6 should be supported as being able to be displaced, but either of the holders may be concretely supported.

In this embodiment, each holder 6 is supported with being able to be sprung back toward the opposite case 6 by two pairs of extension springs secured onto the ends thereof, but instead of this constitution, the stop plates 63 may be supported via rubbery elastic members for elastic supporting holder 6.

Figure 10:
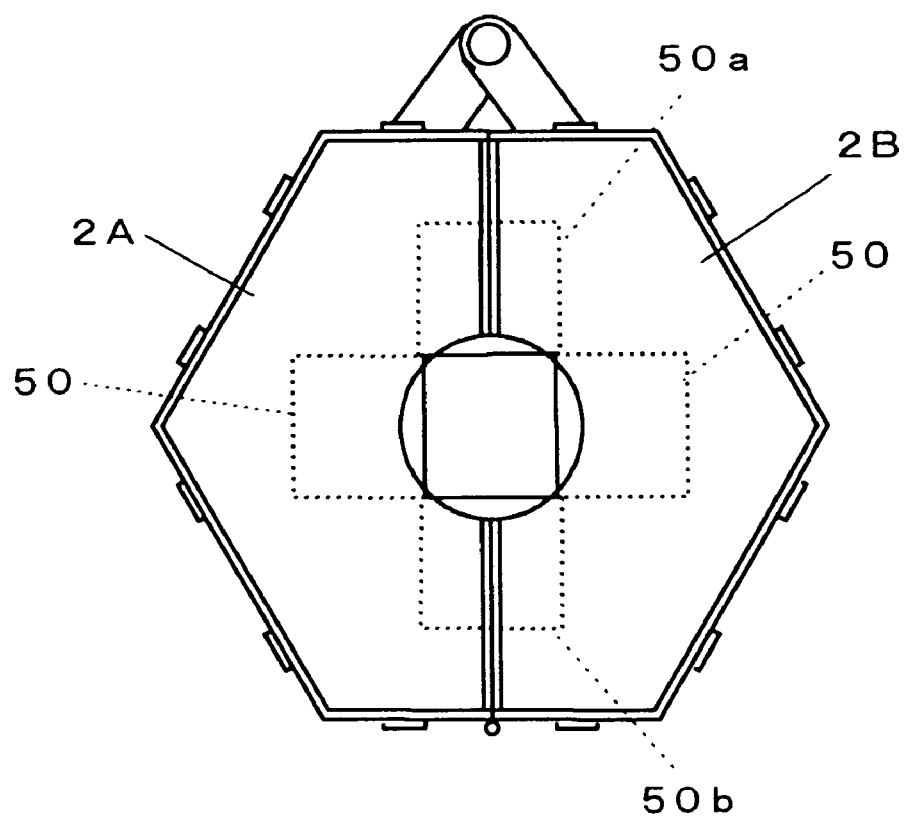
FIG.10 is a side view showing other embodiment of the invention.

In this embodiment, the laminates 50 of the magnets 5 are aligned in the cases 2A and 2B with the respective rows of the laminates 50 being opposed to each other. In addition, as shown in FIG.10, laminates 50a and 50b of the magnets 5 may be aligned as being crossing the cases 2A, 2B, with the rows of the laminates 50a, 50b being opposed to each other.

On mounting the above magnetizing apparatus 1 onto the conduit 10, first, the respective cases 2A and 2B are fitted to the periphery of the conduit 10, in a opened state. Then, the cases 2A and 2B are faced and fastened by locking bars 40a, 40b, 40c introduced into the holes 14a, 14b, 14c of the pipes 12a, 12b, 12c.

When the cases 2A and 2B are faced with positioning the conduit 10 into the grooves 24A, 24B of the cases, the respective holders 6 are displaced by deformation of the elastic members 7 according to the outer diameter of the conduit 10. The respective holders 6 are pushed and adhered to the periphery of the conduit 10 by restoring force of the elastic members 7, so the respective magnetic poles of the magnets 5 in the holders 6 are aligned along the length of the conduit 10, and N and S poles from the respective holders 6 are opposed to each other interposing the conduit 10 therebetween, to generate uniform and strong magnetic forces exerting inside the conduit 10.

On removing the apparatus 1 from the conduit 10, the locking bars 40a, 40b, 40c inside the pipes 12a, 12b, 12c are shifted to unfasten the cases 2A, 2B, and then the cases 2A and 2B are opened.

What is claimed is:

1. A magnetizing apparatus for mounted reception around a periphery of a conduit for exerting magnetic fields inside the conduit with fluids flowing therein, comprising:

a pair of cases which are hinged to each other on a first side, and are separable from one another on a second side across from said first side to thereby permit relative hingable movement of the cases between an open state in which the cases are separated from one another on said second side and a faced state in which the cases are brought together on said second side and face one another;

a fastening unit carried on the cases on said second side for fastening the cases to each other when brought together into said faced state;

a pair of channels formed inside the cases respectively, the pair of channels being opposed to each other to collectively form a clearance space for accommodating said conduit therethrough when the cases are in said faced state;

a pair of holders for holding a plurality of permanent magnets in a mutually aligned orientation therein, each of said pair of holders being installed within a respective one of the pair of channels such that each of the pair of holders are opposed to one another when the cases are oriented in at least said faced states the magnets in respective ones of said pair of holders being aligned along a length of the channels, and respective rows of the magnets being opposed to each other; and elastic members for biasing at least one of the pair of holders in a direction towards an opposed one of the pair of holders, said at least one of said pair of holders being movably supported by the elastic members such that said at least one of said pair of holders so supported can be urged in a direction against the biasing of the elastic members by contact with the conduit when same is received in the clearance space and positioned between the pair of holders opposed to one another.

2. The magnetizing apparatus according to claim 1, wherein:

said fastening unit comprises pipes which are installed on outer surfaces of the cases on said second side, said pipes being mutually aligned along a common longitudinal axis when the cases are in said faced state; and locking members each received within a respective one of the pipes, adjacent ones of the locking members contacting one another end to end, said locking members being shiftable within the pipes along said common longitudinal axis from a first position in which ends of said locking members positionally correspond to a region between adjacent ones of said pipes to another position in which at least one of said ends of said locking members engages a one of said pipes adjacent to said respective one of said pipes, hingable separation of said cases from said faced state to said open state thereby being permitted when said locking members are in said first position and being blocked when said locking members are in said another position.

3. A magnetizing apparatus for exerting magnetic fields inside a conduit when mountably received about the conduit, comprising:

a pair of cases which may be brought together and mutually fastened in faced relationship to one another to define an at least partially enclosed receiving space, said pair of cases being configured to permit passthrough of said conduit within said receiving space along a conduit reception axis when said pair of cases are brought together about the conduit and mutually fastened to one another in said faced relationship; and a pair of magnet groups each mounted within a respective one of said pair of cases, said pair of magnet groups being opposed to one another across said receiving space when said pair of cases are in said faced relationship, magnets of said pair of magnets groups being aligned in a manner creating magnetic lines of force which extend between said pair of magnet groups, at least one of said pair of magnet groups being movable relative a remaining one of said pair of magnet groups in a direction approximately orthogonal to the conduit reception axis, said at least one of said pair of magnet groups being biased towards said remaining one of said magnet groups whereby, as said cases are brought together about the conduit into said faced relationship, said at least one of the magnet groups initially contacts a side of the conduit, continued closure of said cases urging said at least one of said magnet groups against said biasing away from said remaining one of said magnet groups, said at least one of the magnet groups remaining in biased contact with the conduit upon completion of closure of the cases into said faced relationship.

4. The magnetizing apparatus according to claim 3, wherein the cases are hingably connected to one another along a first side and openable at a second side.

5. The magnetizing apparatus according to claim 4, further comprising:

a fastening unit including pipes carried on outer surfaces of the cases on said second side, said pipes being mutually aligned along a common longitudinal axis when the cases are in said faced relationship; and locking members each received within a respective one of the pipes, adjacent ones of the locking members contacting one another end to end, said locking members being shiftable within the pipes along said common longitudinal axis from a first position in which ends of said locking members positionally correspond to a region between adjacent ones of said pipes to another position in which at least one of said ends of said locking members engages a one of said pipes adjacent to said respective one of said pipes, hingable separation of said cases from said faced state to said open state thereby being permitted when said locking members are in said first position and being blocked when said locking members are in said another position.

6. The magnetizing apparatus according to claim 5, wherein said locking members are biased in a direction of said another position.

* * * * *